Patented Aug. 22, 1933

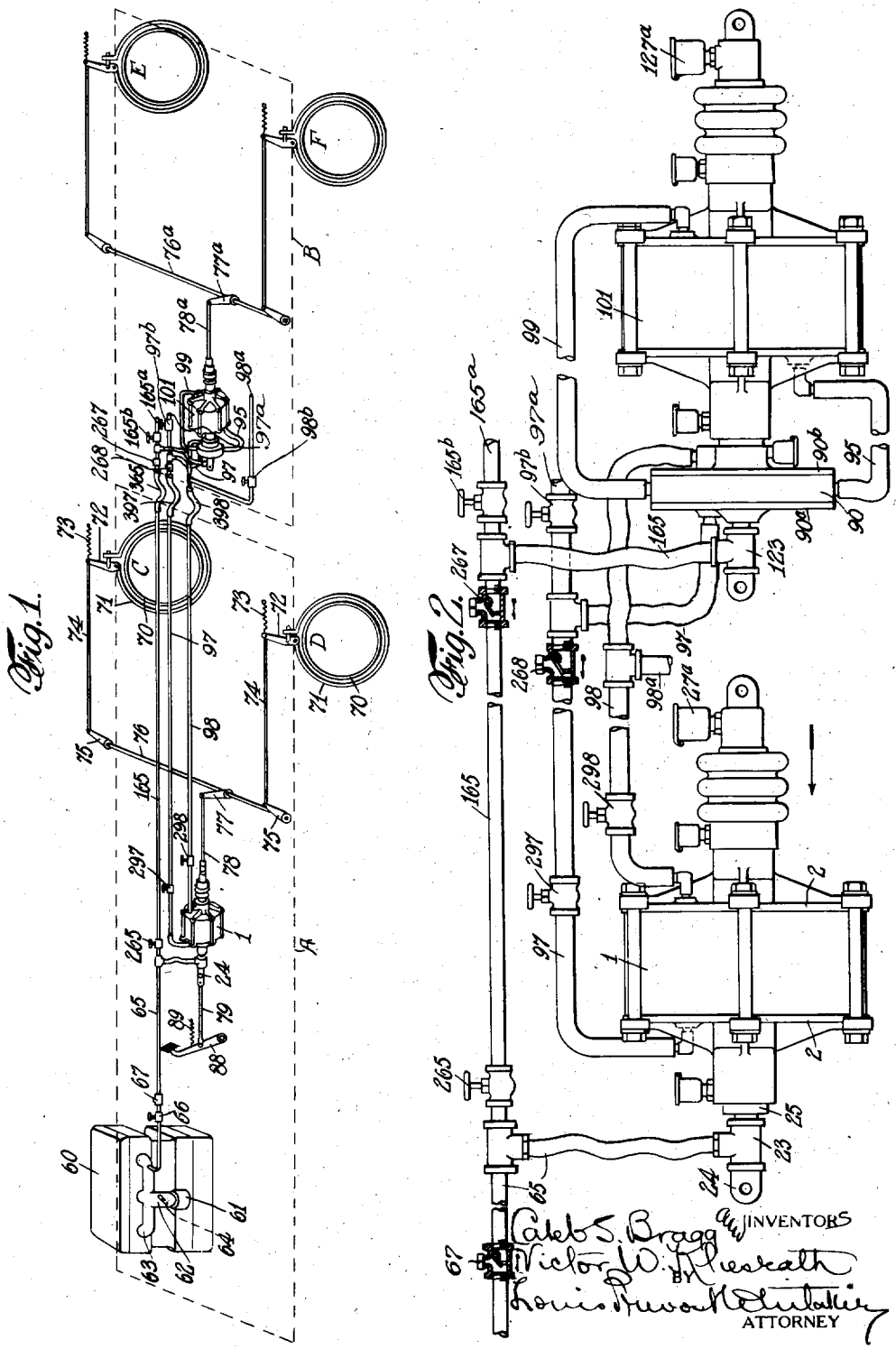

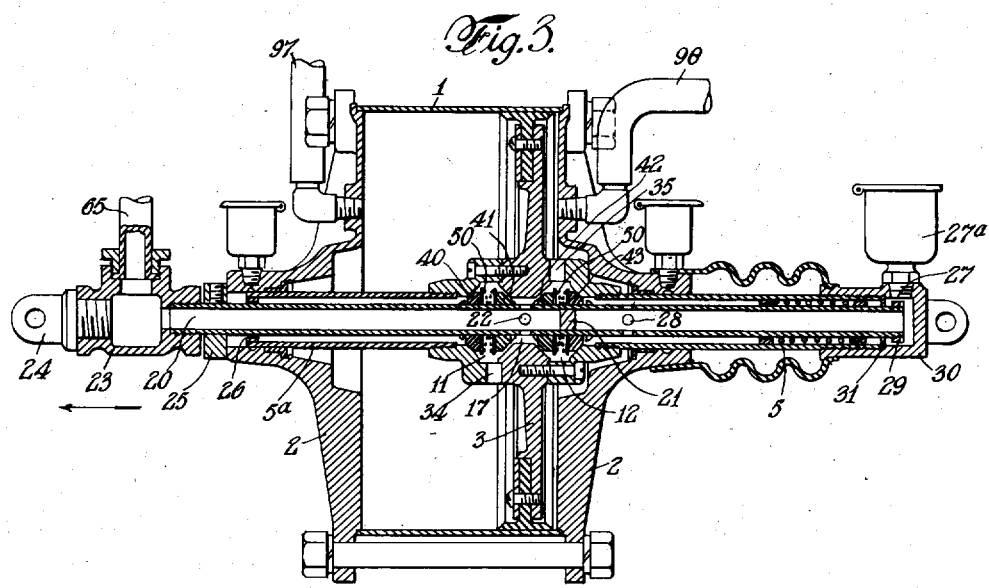
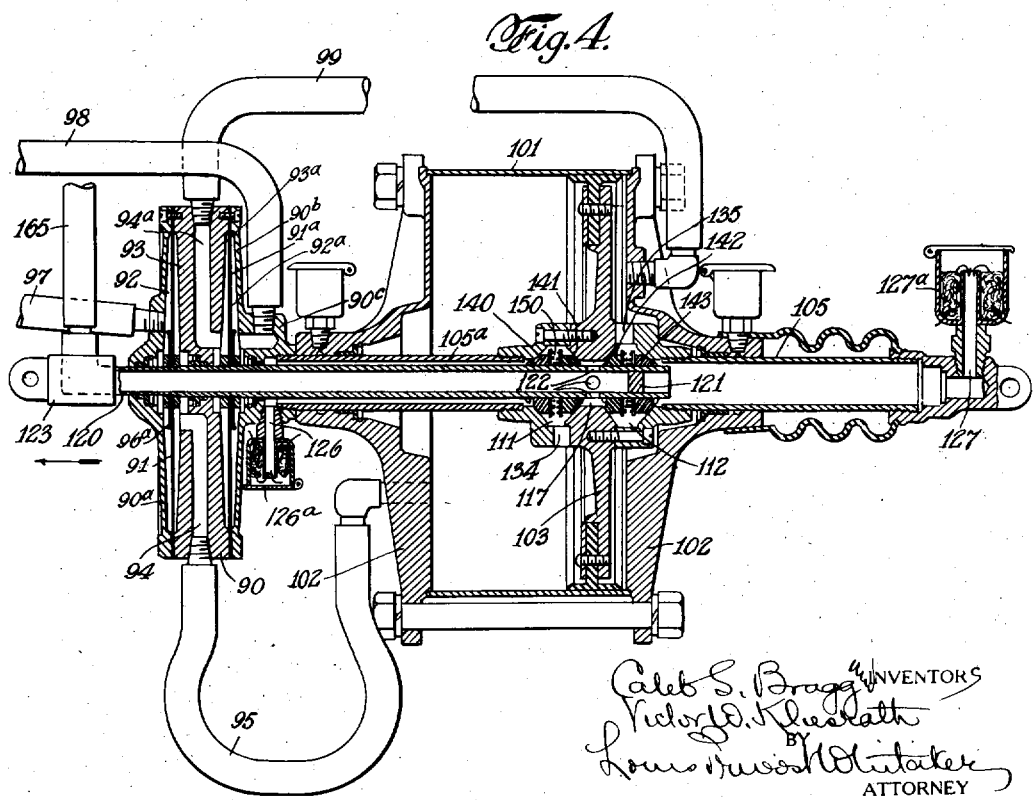

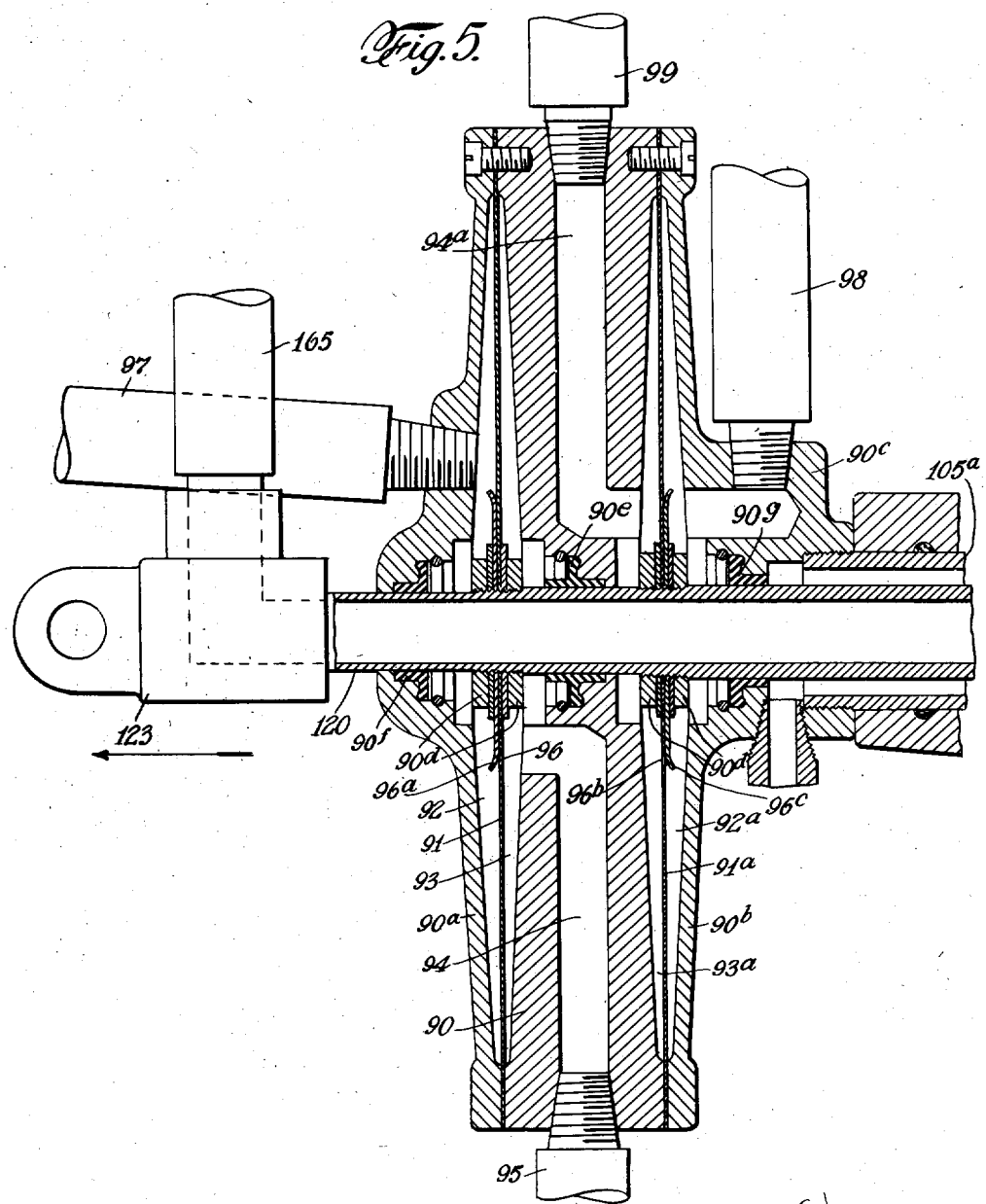

1,923,187

UNITED STATES PATENT OFFICE 1,923,187

POWER ACTUATOR

Caleb S. Bragg, Palm Beach, Fla., and Victor W. Kliesrath, South Bend, Ind., assignors to Bragg-Kliesrath Corporation, South Bend, Ind., a Corporation of New York Substitute for application Serial No. 156,222, December 21, 1926. This application October 1, 1931. Serial No. 566,303

28 Claims. (Cl. 188—152)

Our invention consists in the novel features hereinafter described, reference being had to the accompanying drawings which illustrate one embodiment of the invention selected by us for purposes of illustration, and said invention is fully disclosed in the following description and claims.

In the operation of independently operable brake mechanisms of an automotive vehicle, or independently operable brake mechanisms of an automotive vehicle and a trailing vehicle or vehicles, in which a main power actuator is employed for operating one set of brake mechanisms under the control of operator operated valve mechanism, and an auxiliary power actuator or actuators are operatively connected with the main actuator and arranged to operate other brake mechanisms of the same vehicle or of a trailer, the main and auxiliary actuators being connected by suitable piping so as to be controlled by the valve mechanism of the main actuator, it sometimes happens, especially if the distance between the main and auxiliary actuator or actuators is considerable, that there is a lag or delay in the operation of the auxiliary actuator or actuators on account of the fact that the higher pressure fluid, for example, must traverse piping of considerable length from the main actuator to the auxiliary actuator before it can actuate the piston of an auxiliary actuator. In our former application for Letters Patent of the United States, filed August 30, 1926, and given Serial No. 132,364, said application being abandoned and then refiled on October 1, 1931, as application No. 566,305, we have shown and described an arrangement for operating an auxiliary actuator provided with a single acting piston and having its own controlling valve mechanism associated therewith, by the operator operated valve mechanism of the main actuator, by interposing in the pipe connections between the main and auxiliary actuators a fluid pressure operated control device connected with the piston of the auxiliary actuator and having a movable part connected with the valve mechanism of the auxiliary actuator, so that the variations in pressures within the cylinder of the main actuator effected by the operation of its operator operated valve mechanism will directly effect corresponding movements of the valve mechanism of the auxiliary actuator, admitting higher pressure fluid directly thereto for the application of the brake mechanism operated thereby, and securing the joint and simultaneous operation of the main and auxiliary actuators without appreciable lag or delay in the operation of the latter.

Our present invention has for its object to provide means for controlling the valve mechanism of an auxiliary actuator having a double acting piston through a fluid pressure operated device control, and operated by the operator operated valve mechanism of a main actuator having a double acting piston, in order that the simultaneous operative movements of the main and auxiliary double acting pistons can be obtained without any appreciable lag or delay; and enabling the operator to simultaneously apply all of the independently operable brake mechanisms equally, and to simultaneously and positively release said brake mechanisms, and otherwise simultaneously control the main and auxiliary actuators even though they may be widely separated and the connecting piping relatively long.

Our invention also comprises certain novel features of construction and combination of parts hereinafter fully described, and particularly pointed out in the claims.

Referring to the drawings which illustrate one embodiment of our invention selected by us for purposes of illustration, Figure 1 represents diagrammatically an installation of brake mechanism and actuating means therefor in an automotive vehicle and trailer propelled thereby, and embodying our invention;

Figure 2 is an enlarged view in elevation showing the main actuator and the auxiliary actuator illustrated in Figure 1, and their pipe connections, portions of which are broken away;

Figure 3 is an enlarged sectional view of one form of main actuator which we preferably employ in carrying out our invention, and which is provided with a double acting piston;

Figure 4 is an enlarged sectional view of an auxiliary actuator provided with a double acting piston and having its own controlling valve mechanism, and a fluid pressure operated device operatively connected therewith and with the main actuator; and Figure 5 is an enlarged sectional view of the pressure actuated device illustrated in Figure 4.

In Figure 1, the main or propelling vehicle indicated at A, by dotted lines, is provided with an internal combustion engine for propelling it, indicated at 60, having a carburetor 61 and suction passage 62 extending therefrom to the cylinders and including a manifold 63, the suction passage being provided with the usual throttle valve, indicated at 64. The main vehicle is also provided with suitable brake mechanism which may be applied to two or more of its supporting wheels, and which may be of any desired character. In Figure 1, we have indicated brake mechanisms C and D, by way of example, each comprising a drum 70, brake band 71, operating lever 72 with its retracting spring 73, which may be for example the brake mechanisms for the rear wheels of the main vehicle, the brake levers being shown connected by links 74 with arms 75 on a rock shaft 76 provided with an arm 77 by means of which the brakes may be simultaneously applied. The main vehicle is also shown provided with a main power actuator adapted to be operated by suction and atmospheric pressure, as the low and high pressure mediums, and we have illustrated as the preferred form of said main actuator, a double acting power actuator constructed as shown in our United States Letters Patent No. 1,826,415, dated October 6, 1931. The particular construction of the power actuator and the operator operated valve mechanism thereof forms no part of our present invention and is not specifically claimed herein, and will only be described insofar as it is necessary to an understanding of our present invention.

The main power actuator is illustrated in section in Figure 3, and comprises a cylinder 1 closed at both ends by heads 2, a double acting piston 3 and controlling valve mechanism located preferably in the hub of the piston. The piston is provided with oppositely extending piston rods 5 and 5$^a$, extending through stuffing boxes in the opposite heads, one of the piston rods, in this instance the piston rod 5, being connected by a link 78 with the arm 77 for operating the brake mechanism of the main vehicle, as shown in Figure 1. The piston 3 is provided with a suction chamber 17 in its hub and with valve chambers 11 and 12 located on opposite sides of said chambers, and each containing two oppositely disposed valves, said valves being indicated at 40, of which 41 and 42 are the suction valves, while 40 and 43 are the air inlet valves. Interposed between the valves of each pair are yielding devices indicated at 50, normally tending to seat them. The valves are preferably made of molded rubber or other suitable material having central openings which engage a longitudinally movable valve actuating sleeve 20 extending through both piston rods and the hub of the piston, the valves engaging the sleeve so as to make a tight joint while permitting the movement of the sleeve therethrough. The valve actuating sleeve is provided with a collar to engage each valve in a direction to open it, and the construction is such that a movement of the sleeve in either direction will open one valve of each pair. The piston hub is also provided with ports 34 and 35 for connecting each valve chamber with the cylinder on one side of the piston. The valve mechanism is also connected with a source of suction, as the intake manifold of the internal combustion engine, and with the atmosphere. In this instance the valve sleeve is shown provided with a plug 21, forward of which (at the left in Figure 3) are apertures 22 connecting the interior with the suction chamber 17, and the outer end of the valve sleeve 20 is provided with a fitting 23 connected by a suction pipe 65, a portion of which is flexible, with the intake manifold of the engine between the throttle valve and the cylinders. This fitting is also provided with an ear 24 for connecting it by means of a link 79 with the pedal lever 88, or other operator operated means, provided with the usual retracting spring 89. The valve actuating sleeve 20 is also provided with a stop collar 25 adjustable thereon and adapted to engage the adjacent head of the cylinder, so as to hold the suction valves 41 and 42 in open position when the piston is in retracted position, as shown in Figure 3, thus connecting the cylinder on both sides of the piston with the suction pipe 65 and maintaining the piston normally submerged in vacuum.

Atmospheric air can be admitted to the cylinder on either side of the piston under the control of the valves 40 and 43, the air entering through suitable apertures at the outer ends of the piston rods 5 and 5$^a$ at the points indicated at 26 and 27, the aperture 27 being provided with an air strainer 27$^a$ to exclude dust, and the valve sleeve is also preferably provided with apertures indicated at 28, in the rear of the plug 21, to facilitate the admission of air to the valve 43. Means are also preferably provided for connecting the foot lever with the brake mechanism operated by the actuator, and containing a provision for sufficient lost motion to secure the proper operation of the valves, so that when this lost motion is taken up the physical force of the operator can be applied to the piston and the brake mechanism connected therewith, to positively actuate the brake mechanism in case of failure of power. In this instance the valve actuating sleeve 20 is shown provided with a collar indicated at 29 located between the outer wall of the recess in a cap 30 secured to the piston rod 5 and an inwardly extending collar or flange 31 secured to said piston rod.

The suction pipe 65 is preferably provided with an adjustable restricting valve 66 (see Figure 1) for restricting the passage of air into the intake manifold, and with a check valve 67 for insuring within the actuator cylinder and suction pipe 65 the maximum rarification obtained in the manifold.

In the diagrammatic view, Figure 1, we have shown independently operable brake mechanisms, E, F, for any set of wheels, to be propelled by the internal combustion engine 60, which brake mechanisms are shown located at a considerable distance from the main brake mechanisms D and C and operatively connected with an auxiliary actuator. In the present instance we have shown the auxiliary brake mechanisms and auxiliary actuator as being located on a trailing vehicle, indicated by dotted lines B, and propelled by the main vehicle. It is also to be understood, that while we have only shown in Figure 1 a main vehicle and a single trailer, the apparatus shown in connection with the trailer can be duplicated on other trailers, the auxiliary actuators of which can all be simultaneously operated from the main or master actuator by extending the connecting pipe lines.

The auxiliary brake mechanisms may be of any desired kind, and may be applied to as many wheels as desired. For purposes of illustration we have shown the brake mechanisms, E, F, constructed and connected for joint operation in the same manner as the brake mechanisms of the main vehicle, the corresponding parts on the trailer being given the same numerals with the addition of the letter "a" and these parts need not be again described.

The auxiliary actuator is illustrated in section in Figure 4, and comprises a cylinder 101 closed at both ends by heads 102 and provided with a double acting piston 103, the hub of which is provided with the suction chamber 117, valve chambers 111 and 112, suction valves 141 and 142, air inlet valves 140 and 143, said valves being seated by the yielding devices 150 and ports 134 and 135 connecting the respective valve chambers with the cylinder on opposite sides of the piston, all constructed like the corresponding parts of the main actuator. The piston is also provided with hollow piston rods 105 and 105ª extending through the opposite ends of the cylinder. The piston rod 105 is provided with the air inlet 127 and air strainer 127ª, and the piston rod 105ª in this instance extends beyond the head of the cylinder and is provided with a fluid pressure operated device hereinafter described, the said device being provided in this instance by an air inlet 126 provided with an air strainer 126ª. 120 represents the valve actuating sleeve which extends through the pressure operated device, through the hollow piston rod 105ª and the piston hub and said suction and air inlet valves, and is provided with a plug 121 adjacent to its inner end and with apertures 122 connecting its interior with the suction chamber 117. The exterior portion of the valve actuating sleeve 120 is provided with a fitting 123 connected by a pipe 165, having a flexible portion, with the suction pipe 65 leading to the intake manifold. The valve actuating sleeve 120 is also provided with collars for engaging the valves in a direction to open them, so that a movement of the sleeve in either direction will open one valve of each pair in the same manner as the valves of the main actuator are operated. In this instance, the said collars for the suction valves 141 and 142 are so located that these valves as well as the air inlet valves 140 and 143 all remain seated, as shown in Figure 4, when the apparatus is in the normal position and the piston is retracted. It will be understood that the piston rod 105 is connected by a link 78ª with the arm 77ª in the rock shaft 76ª of the trailer brake mechanism, as shown in Figure 1.

The pressure operated control device comprises preferably a central body portion 90 of circular form recessed on its opposite faces and provided with exterior clamping plates 90ª and 90ᵇ secured thereto by bolts or screws, so as to form two diaphragm chambers on opposite sides of the central portion 90 through each of which extends a diaphragm 91 and 91ª, respectively, the outer edges of which are clamped between the central portion 90 and one of said plates 90ª and 90ᵇ. The plate 90ᵇ is provided with a hub portion 90ᶜ which is screwed upon or otherwise secured to the outer end of the hollow piston rod 105ª, thus supporting the entire device upon and for movement with said piston rod. The valve actuating sleeve extends through packing sleeve 90ᵉ in the central portion and clamping plates of the fluid pressure operated device, and is movable longitudinally therethrough. Said sleeve also extends through central apertures in each of the diaphragms, but is provided with clamping nuts on opposite sides of each diaphragm, as indicated at 90ᵈ, so that the central portions of the diaphragms move with the sleeve 120. The diaphragm 91 on the outer face of the central portion 90, at the left in Figures 4 and 5, divides that diaphragm chamber into two chambers 92 and 93. The exterior chamber 92 is connected by means of a pipe 97 with the cylinder of the main actuator on the forward side of the piston thereof, at the left in all the figures. The chamber 93 is connected by means of a passage 94 in the central portion or body 90 and by a flexible pipe 95 with the cylinder 101 of the auxiliary actuator on the forward side of the piston 103 therein. The diaphragm 91 is also provided with an aperture indicated at 96, which is normally closed by a check valve 96ª opening in a direction toward the chamber 92, and which may be formed by a piece of leather, rubber, or other flexible material, or otherwise. From this construction it will be seen, that air may be withdrawn from the auxiliary cylinder 101 forward of the piston through the pipe 95, passage 94, aperture 96 and pipe 97 to the forward end of the main actuator cylinder, but it cannot flow in the opposite direction. The chamber on the rear face of the body portion 90 of the fluid pressure operated device is divided by the diaphragm 91ª into two chambers 92ª and 93ª. The chamber 92ª is connected by a pipe 98 with the cylinder 1 of the main actuator in rear of the piston therein, while the chamber 93ª is connected by a passage 94ª in the central portion 90 of the pressure operated device and by a pipe 99, having flexible portions, with the cylinder 101 of the auxiliary actuator in rear of the piston therein. The diaphragm 91ª is also provided with a small aperture indicated at 96ᵇ, closed by a check valve 96ᶜ, shown as a flap valve, so arranged that air may be withdrawn from the auxiliary actuator cylinder 101 through the pipe 99, passage 94ª, aperture 96ᵇ and the pipe 98 to the corresponding end of the main actuator cylinder 1, but is not permitted to flow in the opposite direction.

Where more than one trailer is employed, the suction pipe 165 and the connecting pipes 97 and 98 may be provided with extensions indicated at 165ª, 97ª and 98ª, respectively, and broken away in Figure 1, extending to a similarly constructed auxiliary actuator on another trailer, etc., said pipes being preferably provided with cut-off valves indicated at 165ᵇ, 97ᵇ and 98ᵇ, which can be closed when no additional trailer is employed. In like manner the suction pipe 65 and connecting pipes 97 and 98 may also be provided with cut-off valves indicated at 265, 297 and 298 in Figure 1, which can be closed when the trailer indicated at B is not employed, in which case the main actuator will be operated to control the brake mechanism of the main vehicle only. It will also be understood that the pipes 165, 97 and 98 will be provided with suitable flexible portions indicated at 365, 397 and 398, extending from the main vehicle to the trailer to compensate the slight relative movements of the two vehicles.

Assuming that the parts are arranged as shown in the drawings and as previously described, when the internal combustion engine is in operation and the throttle valve closed or partially closed, the air will be exhausted from the main actuator cylinder on both sides of the piston through the suction pipe 65 and the air will also be exhausted from both ends of the auxiliary actuator cylinder through the pipes 97 and 98, which communicate with the corresponding ends of the auxiliary actuator cylinder in the manner previously described through the openings 96 and 96ᵇ in the respective diaphragms of the pressure actuated device, thus maintaining both the main piston and the auxiliary piston submerged in vacuum. Obviously to operate the pistons it is only necessary to admit air at atmospheric pressure in rear of said pistons, which will produce the forward movement of each piston without admitting any appreciable air to the intake manifold, thus preventing the liability of stalling the engine if idling, or otherwise interfering with its operation. If the operator desires to apply the brakes, he will depress the foot lever 88, thus shifting the valve actuating sleeve 20 of the main actuator forward in the direction of the arrow in Figure 3. This will open the suction valve 41 further, closing the suction valve 42 and opening the air inlet valve 43 of the main actuator, thus admitting atmospheric air to the rear end of the main actuator cylinder and increasing the pressure therein. This increase of pressure being immediately communicated through the pipe 98 to the chamber 92$^a$ of the fluid pressure operated device, closing the flap valve 96$^c$ in the diaphragm 91$^a$ and flexing the diaphragm in the direction of the arrow in Figures 4 and 5, thereby moving the sleeve 120 in the direction of the arrow, and opening the suction valve 141 and the air inlet valve 143 of the auxiliary actuator. Pressures remaining equal on both sides of diaphragm 91, said diaphragm offers no resistance to the movement of diaphragm 91$^a$. This instantly admits air at atmospheric pressure in rear of the piston 103 through the air cleaner 127$^a$ and the air inlet 127, and connects the cylinder 101 forward of the piston with the suction pipe 165 through the valve actuating sleeve 120, so that the piston 103 immediately moves forward substantially simultaneously with the movement of the main actuator piston, each actuator piston operating under the control of its own valve mechanism, the valve mechanism of the auxiliary actuator being controlled by the operator operated valve mechanism of the main actuator through the fluid pressure operated device previously described. It will be seen that the atmospheric air which operates the auxiliary piston instead of having to enter the main actuator cylinder and be transmitted through intervening pipe connections to the auxiliary cylinder enters the auxiliary actuator cylinder directly, thus obviating any lag in the operation of the auxiliary actuator, which would otherwise be likely to occur. Approximately equal pressures will be exerted on the main and auxiliary pistons tending to move them simultaneously forward as long as the operator continues to advance the foot lever and the valve actuating sleeve 20 of the main actuator, thus simultaneously and equally applying the brake mechanisms connected with said pistons, which as before stated may be separate brake mechanisms of the same vehicle, or brake mechanisms of different vehicles, as a main vehicle and trailer.

As soon as the forward movement of the operator's foot ceases, the continued forward movement of the main actuator piston 3 will move it forward slightly with respect to said sleeve, permitting the air inlet valve 43 to close. This stops the forward movement of the main actuator piston, holding the brakes controlled thereby applied. As soon as the main actuator air inlet valve 43 closes, the slightest continued admission of air into the cylinder 101 in rear of the piston will equalize pressures in chambers 92$^a$ and 93$^a$ on opposite sides of the diaphragm 91$^a$, and permit the sleeve 120 to move in a direction opposite to that of the arrow, Figure 4, with respect to the piston 103 under the tension of the compressed springs 150, thus closing the inlet valve 143 and holding the brakes controlled by the auxiliary actuator as applied with a pressure equal to that of the master or main cylinders.

The operator can release the atmospheric pressures in both cylinders and permit both sets of brake mechanisms to relieve themselves by slightly releasing his pressure on the pedal of the main actuator, which will again permit the suction valve 42 to open, and permit an equalization of pressures in the main actuator cylinder through the suction valves 41 and 42, connecting the main actuator cylinder on both sides of the piston with the suction chamber. The consequent reduction of pressure in the main actuator cylinder in rear of the piston will be instantly transmitted to the chamber 92$^a$ in rear of the diaphragm 91$^a$ through the pipe 98, and if the differences in pressure on opposite sides of this diaphragm are sufficiently great, will also flex the diaphragm in the direction opposite that indicated by the arrow in Figures 4 and 5, slightly opening this suction valve 142 and the air inlet valve 140 and producing corresponding equalization of pressures within the auxiliary actuator cylinder 101 and permitting both sets of brakes to relieve themselves to the same extent. When the pressures are equalized on the opposite sides of the diaphragms 91 and 91$^a$, the auxiliary actuator valves will be returned by the springs 150 to the closed position, and the operator can instantly reapply the brakes, where repeated applications are desired, by again pressing the pedal lever forward.

When the operator desires to return the brakes and the pistons to normal or retracted position, he will remove his foot from the pedal lever, allowing it to be retracted by its spring 89, shifting the valve actuating sleeve in a direction opposite to that indicated by the arrow in Figure 3, further opening the suction valve 42, closing the suction valve 41 and opening the air inlet valve 40 to admit air at atmospheric pressure to the main actuator cylinder forward of the piston, while connecting the cylinder in rear of the piston with the suction pipe. The increase in pressure on the forward side of the piston of the main actuator will be communicated through the pipe 97 to the chamber 92 on the forward side of the diaphragm 91, closing the flap valve 96$^a$ and flexing the diaphragm 91 in a direction opposite that of the arrow in Figure 4, thereby shifting the sleeve 120 rearwardly and opening the suction valve 142 and the air inlet valve 140. Simultaneously the reduction of pressure in the rear of the main actuator cylinder is accompanied, by means of pipe 98, with a corresponding reduction in pressure in the chamber 92$^a$, which will cause diaphragm 91$^a$ also to flex in a direction opposite to that of the arrow until the pressures within the chambers 92$^a$ and 93$^a$ are equalized through the passage 96$^b$. This connects the auxiliary cylinder 101 in rear of the piston with the suction pipe 165 through the suction chamber 117 and the sleeve 120, and admits air to the cylinder on the forward side of the piston through the air inlet 126 and the hollow piston rod 105$^a$. Both pistons, therefore, will be returned to their retracted or normal positions, shown in Figures 3 and 4. The stop collar 25, on the valve actuating sleeve 20 of the main actuator, strikes the end of the adjacent cylinder head 2 just before the piston 3 comes to rest, effecting a slight movement of the sleeve with respect to the piston sufficient to permit the air inlet valve 40 to close, and again partially opening the suction valve 41 and partially closing the suction valve 42 which still remains slightly open, thus equalizing the pressures in the cylinder on opposite sides of the piston, and connecting the cylinder on both sides of the piston with the suction pipe 65. Chamber 92 is then in communication with the suction passage through the pipe 97, while chamber 93 is connected with the higher or atmospheric pressure forward of the piston in the auxiliary actuator cylinder by pipe 95, and the chambers 92 and 93 are in communication with each other through the passage 96. The diaphragm 91 will be returned to the normal position, closing suction valve 142 and air inlet valve 140 by the higher pressure in chamber 93, which cannot be instantaneously equalized with chamber 92 through the limited opening of the passage 96, but after the diaphragm and valves are returned to the neutral or closed position the air remaining in the auxiliary cylinder forward of the piston will be withdrawn through the passage 96 and through the main cylinder forward of the piston, while the auxiliary cylinder in rear of the piston is in communication with suction through pipe 99, chambers 92ᵃ and 93ᵃ, aperture 96ᵇ, pipe 98 and the portion of the main cylinder in rear of the piston, the parts being restored to the original positions indicated in Figures 3 and 4.

It will thus be seen that both the main and auxiliary cylinders are maintained in an exhausted condition on both sides of the pistons therein, when the pistons are in retracted position, or, in other words, the pistons are submerged in vacuum. The operation of the operator controlled valve mechanism of the main actuator in a direction to apply the brakes effects the admission of air directly to the main actuator cylinder in rear of the piston accompanied by the instantaneous operation of the valve mechanism of the auxiliary actuator, to admit air directly from the atmosphere into the auxiliary actuator cylinder in rear of its piston, and effecting the substantially simultaneous and substantially equal operation of both pistons to apply the brakes connected therewith with substantially equal pressures, and without admitting any appreciable quantity of air from either cylinder forward of the piston to the intake manifold of the engine, the operation of both pistons being under the single control of the operator operated part or foot lever 88. The pressures in both actuator cylinders may be equalized substantially simultaneously to permit the brakes to relieve themselves, the brakes may be substantially simultaneously reapplied and released and reapplied as often as necessary, as in traffic or on a long down grade, all under the single control of the operator operated part, and by releasing the operator operated part and permitting it to be retracted by its spring, both pistons will be simultaneously restored by power to retracted position, together with brake mechanisms, and when in retracted position, the main and auxiliary actuator cylinders will be again connected with the source of suction on both sides of the piston in each cylinder, to equalize pressures and again submerge the pistons in vacuum.

It will thus be seen that the usual lag in the operation of the auxiliary actuator or actuators, which would necessarily result if the atmospheric air or other higher pressure fluid for operating the auxiliary actuator piston had to pass through the pipe connections from the main or master actuator cylinder, is avoided. It will also be seen that a standard sized main actuator may be used singly or to operate one or more auxiliary actuators without the necessity of increasing either the areas of the passages or the valves, which would be necessary if the air required to operate one or more auxiliary actuators had to pass through the main actuator cylinder. The diaphragms of the pressure actuated device are practically instantly responsive to variations in pressures in the master cylinder, and by operating the independent valve mechanism of the auxiliary actuator effect a practically simultaneous operation of the main and auxiliary pistons. It will also be noted that each diaphragm chamber is provided with a by-pass, herein shown in the form of the apertures 96 and 96ᵇ formed in the diaphragms themselves, (but which need not necessarily be in the diaphragms), which by-passes serve to connect the chambers on the opposite side of each diaphragm with each other, and connect the auxiliary cylinder on both sides of the piston with the corresponding portion of the main cylinder and therethrough with the intake manifold, through the partly opened suction valves 41 and 42 thereof, when the pistons are in retracted position, while the said by-passes are provided with valves, in this instance the flap valves 96ᵃ and 96ᶜ, which instantly close the respective by-passes whenever the pressure is to be exerted upon one or the other of said diaphragms in a direction to operate the independent valve mechanism of the auxiliary actuator. After the piston of the main actuator cylinder has returned to its normal or off position and the controlling valve mechanism for the auxiliary actuator has returned to its neutral or normal position, these by-passes and check valves exhaust any air remaining in either end of the auxiliary cylinder, which air has not sufficient pressure to flex either of the diaphragms and which might retard the proper operation of the auxiliary actuator piston.

It will also be noted that by reason of the connection between the valve actuating sleeve of the main actuator and the main actuator piston, effected by the collar 29 and the flange 31, before described, which provide a sufficient amount of lost motion to allow the controlling valves of the main actuator to be operated, the operator can add his physical power to that of the main actuator in the application of the brake mechanism connected with the main actuator, and it will also be understood that if the power fails for any reason, the operator can by depressing the foot lever 88 move the controlling valve into position to vent the cylinder of the main actuator, that is by opening valve 41 and valve 43, and by further depressing the foot lever 88 to bring the collar 29 into contact with the flange 31 he may then positively move the main actuator piston and apply the brakes connected therewith by his own physical power, so as to prevent an accident which might otherwise occur.

We also prefer to provide the portions of the pipes 165 and 97 on the trailer in rear of the flexible connections 365 and 397 with check valves indicated in Figures 1 and 2 at 267 and 268, respectively. Should the vehicles separate, as by the coupling becoming broken or detached, these check valves will prevent the admission of atmospheric air through the pipes 165 and 97, but the rupture of pipe 98, which will also take place, which pipe is not provided with a check valve, will permit atmospheric air to pass into the chamber 92ᵃ of the pressure operated device, which will flex the diaphragm 91ᵃ in the direction of the arrow, see Figures 4 and 5, opening the air inlet valve 143 of the auxiliary actuator, and admit atmospheric air to the cylinder in rear of the piston, applying the brakes of the trailer and holding the same applied for a considerable period of time if the cylinder and valves are in proper working condition. Atmospheric air will also be admitted through the portion of the pipe 98 on the tractor to the master actuator cylinder in rear of its piston, applying the tractor brakes momentarily as air will also reach the master cylinder forward of the piston through the pipe 97, which would result in equalizing pressures and releasing the tractor brakes. Air would also be admitted freely to the intake manifold of the engine through the pipe 165 and suction pipe 65, which would interfere to a greater or less extent of the operation of the motor, depending upon the position of the throttle valve, and this momentary application of the tractor brakes and interference with the operation of the motor will bring to the attention of the driver of the tractor the fact that something is wrong.

This application is a substitute for abandoned application No. 156,222, filed December 21, 1926.

What we claim and desire to secure by Letters Patent is:—

1. The combination with a main power actuator comprising a cylinder, a double acting piston therein, a main reversing valve mechanism therefor, means for establishing differential pressures on opposite faces of the piston under the control of said reversing valve mechanism, an operator operated part connected with said reversing valve mechanism, means for connecting said piston with a part to be operated, an auxiliary actuator comprising a cylinder, a double acting piston therein, independent reversing valve mechanism therefor, means for establishing differential pressures on opposite faces of said auxiliary piston under the control of its valve mechanism, and means for connecting the auxiliary actuator piston with a part to be operated, of a fluid pressure operated control device having movable pressure operated portions operatively connected with the said independent valve mechanism of the auxiliary actuator, and pipe connections between said control device and the main actuator cylinder, and between said control device and the auxiliary actuator cylinder, for effecting the operation of said movable portions of the control device and the reversing valve mechanism of the auxiliary actuator by variations of pressure within the main and auxiliary actuator cylinders.

2. The combination with a main power actuator comprising a cylinder, a double acting piston therein, a main controlling and reversing valve mechanism therefor, and means for connecting said cylinder with a source of suction and with the atmosphere under the control of said valve mechanism, an operator operated part connected with said valve mechanism, an auxiliary actuator comprising a cylinder, a double acting piston therein, independent controlling and reversing valve mechanism therefor, and means for connecting said cylinder with said source of suction and directly with the atmosphere under the control of said independent valve mechanism, of a fluid pressure operated control device having movable pressure operated portions operatively connected with said independent valve mechanism of the auxiliary actuator, and pipe connections between said control device and the main and auxiliary actuator cylinders for effecting the operation of said movable portion of the control device and the reversing valve mechanism of the auxiliary actuator by variations of pressure within said cylinders, and means for connecting each of said pistons with a part to be actuated.

3. The combination with a main power actuator comprising a cylinder, a double acting piston therein, a main controlling and reversing valve mechanism therefor, and means for connecting said cylinder with a source of suction and with the atmosphere under the control of said valve mechanism, an operator operated part connected with said valve mechanism, an auxiliary actuator comprising a cylinder, a double acting piston therein, independent controlling and reversing valve mechanism therefor, and means for connecting said cylinder with said source of suction and directly with the atmosphere under the control of said independent valve mechanism, of a fluid pressure operated control device having movable pressure operated portions operatively connected with said independent valve mechanism of the auxiliary actuator, and pipe connections between said control device and the main and auxiliary actuator cylinders for effecting the operation of said movable portion of the control device and the reversing valve mechanism of the auxiliary actuator by variations of pressure within said cylinders, means for maintaining a connection between the source of suction and each of said cylinders on both sides of the pistons therein when the main actuator piston is in retracted position, and means for connecting each piston with a part to be actuated thereby.

4. The combination with a main power actuator comprising a cylinder, a double acting piston therein, main reversing valve mechanism therefor, means for connecting said cylinder with a source of suction and with the atmosphere under the control of said reversing valve mechanism, said valve mechanism being constructed to connect the portions of the cylinders on both sides of the piston with the source of suction when the piston is in retracted position, to maintain the piston submerged in vacuum, an operator operated part connected with said valve mechanism, and means for connecting said piston with a part to be operated, an auxiliary actuator comprising a cylinder, a double acting piston therein, independent reversing valve mechanism therefor, means for connecting said cylinder directly with said source of suction and the atmosphere under the control of said reversing valve mechanism, of a fluid pressure operated control device located adjacent to the auxiliary actuator, and having movable pressure operated portions operatively connected with said independent reversing valve mechanism thereof, pipe connections between said control device and the cylinders of the main and auxiliary actuators for effecting the operation of the valve mechanism of the auxiliary actuators, by variations of pressure within said cylinders, said control device being provided with means for connecting the corresponding portions of said cylinders with each other through said pipe connections when the master piston is in retracted position, to connect the portion of the auxiliary actuator cylinder on both sides of the piston therein with the source of suction, and maintain the auxiliary piston also submerged in vacuum.

5. The combination with a main power actuator comprising a cylinder, a double acting piston therein, main reversing valve mechanism therefor, means for connecting said cylinder with a source of suction and with the atmosphere under the control of said reversing valve mechanism, said valve mechanism being constructed to connect the portions of the cylinders on both sides of the piston with the source of suction when the piston is in retracted position, to maintain the piston submerged in vacuum, an operator operated part connected with said valve mechanism, and means for connecting said piston with a part to be operated, an auxiliary actuator comprising a cylinder, a double acting piston therein, independent reversing valve mechanism therefor, means for connecting said cylinder directly with said source of suction and the atmosphere under the control of said reversing valve mechanism, of a fluid pressure operated control device located adjacent to the auxiliary actuator, and having movable pressure operated portions operatively connected with said independent reversing valve mechanism thereof, pipe connections between said control device and the cylinders of the main and auxiliary actuators for effecting the operation of the valve mechanism of the auxiliary actuator, by variations of pressures within said cylinders, said control device being provided with by-passes for connecting the corresponding ends of said cylinders with each other when the master piston is in retracted position, to maintain the auxiliary actuator piston also submerged in vacuum, and check valves controlling said by-passes.

6. The combination with a main power actuator comprising a cylinder, a double acting piston therein, a main reversing valve mechanism therefor, means for establishing differential pressures on opposite faces of the piston under the control of said reversing valve mechanism, an operator operated part connected with said reversing valve mechanism, means for connecting said piston with a part to be operated, an auxiliary actuator comprising a cylinder, a double acting piston therein, independent reversing valve mechanism therefor, means for establishing differential pressures on opposite faces of said auxiliary piston under the control of its valve mechanism, means for connecting the auxiliary actuator piston with a part to be operated, of a fluid pressure operated control device having movable pressure operated portions, operatively connected with the valve mechanism for the reversing valve mechanism of the auxiliary actuator, and pipe connections between said control device and the main actuator cylinder, and between said control device and the auxiliary actuator cylinder, for effecting the operation of said movable portions of the control device and the reversing valve mechanism of the auxiliary actuator by variations of pressure within the main and auxiliary actuator cylinders, said control device being provided with by-passes for connecting the corresponding portions of said main and auxiliary actuator cylinders with the source of lower pressure independently of the valve mechanism of the auxiliary actuator, and check valves controlling said by-passes.

7. The combination with a main power actuator comprising a cylinder, a double acting piston therein, a main reversing valve mechanism therefor, means for establishing differential pressures on opposite faces of the piston under the control of said reversing valve mechanism, an operator operated part connected with said reversing valve mechanism, means for connecting said piston with a part to be operated, an auxiliary actuator comprising a cylinder, a double acting piston therein, independent reversing valve mechanism therefor, means for establishing differential pressures on opposite faces of said auxiliary piston under the control of its valve mechanism, means for connecting the auxiliary actuator piston with a part to be operated, of a fluid pressure operated control device provided with two separated chambers, each provided with a pressure operated movable part therein, operatively connected with the reversing valve mechanism for the auxiliary actuator, pipe connections from each chamber on opposite sides of the said movable part therein to the corresponding portions of the main and auxiliary actuator cylinders, for effecting the operation of the reversing valve mechanism of the auxiliary actuator by the operation of the valve mechanism of the main actuator under the control of the operator operated part.

8. The combination with a main power actuator comprising a cylinder, a double acting piston therein, a main reversing valve mechanism therefor, means for establishing differential pressures on opposite faces of the piston under the control of said reversing valve mechanism, an operator operated part connected with said reversing valve mechanism, means for connecting said piston with a part to be operated, an auxiliary actuator comprising a cylinder, a double acting piston therein, independent reversing valve mechanism therefor, means for establishing differential pressures on opposite faces of said auxiliary piston under the control of its valve mechanism, means for connecting the auxiliary actuator piston with a part to be operated, of a fluid pressure operated control device provided with two separated chambers, each provided with a pressure operated movable part therein, operatively connected with the reversing valve mechanism for the auxiliary actuator, pipe connections from each chamber on opposite sides of the said movable part therein to the corresponding portions of the main and auxiliary actuator cylinders, said pipe connections being constructed to effect a movement of the reversing valve mechanism with the auxiliary actuator in one direction by an increase of pressure in the main actuator cylinder on one side of the piston therein, and to effect the movement of the said valve mechanism in the reverse direction by an increase of pressure in the main actuator cylinder on the other side of the piston therein, whereby said main and auxiliary pistons will be substantially simultaneously actuated in either direction under the control of the operator operated valve mechanism of the main actuator.

9. The combination with a main power actuator comprising a cylinder, a double acting piston therein, a main reversing valve mechanism therefor, means for establishing differential pressures on opposite faces of the piston under the control of said reversing valve mechanism, an operator operated part connected with said reversing valve mechanism, means for connecting said piston with a part to be operated, an auxiliary actuator comprising a cylinder, a double acting piston therein, independent reversing valve mechanism therefor, means for establishing differential pressures on opposite faces of said auxiliary piston under the control of its valve mechanism, means for connecting the auxiliary actuator piston with a part to be operated, of a fluid pressure operated control device provided with two separated chambers, each provided with a pressure operated movable part therein, operatively connected with the reversing valve mechanism for the auxiliary actuator, pipe connections from each chamber on opposite sides of the said movable part therein to the corresponding portions of the main and auxiliary actuator cylinders, said pressure operated movable parts being co-axial and connected for joint operation, and said pipe connections being constructed to effect the movement of said movable parts and the reversing valve mechanism of the auxiliary actuator in one direction by an increase of pressure in the main actuator cylinder on one side of the piston therein, and in the opposite direction by an increase of pressure in the main actuator cylinder on the other side of the piston therein, whereby the substantially simultaneous operation of both pistons in either direction is controlled by the operator operated valve mechanism of the main actuator.

10. The combination with a main power actuator comprising a cylinder, a double acting piston therein, a main reversing valve mechanism therefor, means for establishing differential pressures on opposite faces of the piston under the control of said reversing valve mechanism, an operator operated part connected with said reversing valve mechanism, means for connecting said piston with a part to be operated, an auxiliary actuator comprising a cylinder, a double acting piston therein, independent reversing valve mechanism therefor, means for establishing differential pressures on opposite faces of said auxiliary piston under the control of its valve mechanism, means for connecting the auxiliary actuator piston with a part to be operated, of a fluid pressure operated control device provided with two separated chambers, each provided with a pressure operated movable part therein, operatively connected with the reversing valve mechanism for the auxiliary actuator, pipe connections from each chamber on opposite sides of the said movable part therein to the corresponding portions of the main and auxiliary actuator cylinders, for effecting the operation of the reversing valve mechanism of the auxiliary actuator by the operation of the valve mechanism of the main actuator under the control of the operator operated part, each chamber of said control device being provided with a by-pass from one side of the movable part therein to the other, for connecting the auxiliary actuator cylinder on opposite sides of its piston with the source of lower pressure, independently of the valve mechanism of the auxiliary actuator, and a check valve for each of said by-passes.

11. The combination with a main power actuator comprising a cylinder, a double acting piston therein, main reversing valve mechanism therefor, means for connecting said cylinder with a source of suction and with the atmosphere under the control of said reversing valve mechanism, said valve mechanism being constructed to connect the portions of the cylinders on both sides of the piston with the source of suction when the piston is in retracted position, to maintain the piston submerged in vacuum, an operator operated part connected with said valve mechanism, and means for connecting said piston with a part to be operated, an auxiliary actuator comprising a cylinder, a double acting piston therein, independent reversing valve mechanism therefor, means for connecting said cylinder directly with said source of suction and the atmosphere under the control of said reversing valve mechanism, of a fluid pressure operated control device located adjacent to the auxiliary actuator and provided with two separated chambers, a pressure operated movable part in each of said chambers, operatively connected with the valve mechanism for the auxiliary actuator, pipe connections between each of said chambers on opposite sides of the movable part therein to the corresponding portions of the main and auxiliary actuator cylinders, to effect the operation of said movable parts and the valve mechanism of the auxiliary actuator by the operator controlled valve mechanism of the main actuator, each of the chambers of said control device being provided with a by-pass from one side of the movable part therein to the other, for connecting the auxiliary actuator cylinder on both sides of its piston with the corresponding portions of the main actuator cylinder, independently of the valve mechanism of the auxiliary actuator, and maintain said piston also submerged in vacuum when the main actuator piston is in retracted position, and check valves controlling said by-passes.

12. The combination with a main power actuator comprising a cylinder closed at both ends, a double acting piston in said cylinder, reversing valve mechanism for said actuator, means for connecting said cylinder with a source of suction and with the atmosphere under the control of said valve mechanism, an operator operated part connected with said valve mechanism, and means for connecting said piston with a part to be operated, an auxiliary actuator comprising a cylinder closed at both ends, a double acting piston in said cylinder, controlling valve mechanism for the auxiliary actuator located in the piston thereof, means for connecting said valve mechanism with said source of suction and with the atmosphere, a hollow piston rod connected with said auxiliary actuator piston and extending through one end of the cylinder thereof, said valve mechanism being constructed to connect the portion of the auxiliary actuator cylinder on one side of the piston with the source of suction, and the portion on the opposite side of the piston with the atmosphere, and to reverse said connections, of a fluid pressure operated control device carried by said hollow piston rod and movable therewith, and provided with two co-axial separate pressure chambers, a movable pressure operated part in each chamber, a valve operating device connecting said movable parts with said reversing valve mechanism for operating the same, pipe connections from each of said chambers on opposite sides of the movable pressure operated part therein to corresponding portions of the main and auxiliary actuator cylinders, to effect the operation of said movable parts and the valve mechanism of the auxiliary actuator by the operator controlled valve mechanism of the main actuator, and means for connecting the auxiliary piston with a part to be operated.

13. The combination with a main power actuator comprising a cylinder closed at both ends, a double acting piston in said cylinder, reversing valve mechanism for said actuator, means for connecting said cylinder with a source of suction and with the atmosphere under the control of said valve mechanism, an operator operated part connected with said valve mechanism, and means for connecting said piston with a part to be operated, an auxiliary actuator comprising a cylinder closed at both ends, a double acting piston in said cylinder, controlling valve mechanism for the auxiliary actuator located in the piston thereof, means for connecting said valve mechanism with said source of suction and with the atmosphere, hollow piston rods connected with said auxiliary actuator piston and extending through the ends of the cylinder thereof, said valve mechanism being constructed to connect the portion of the auxiliary actuator cylinder on one side of the piston with the source of suction, and the portion on the opposite side of the piston with the atmosphere, and to reverse said connections, of a fluid pressure operated control device carried by one of said hollow piston rods and movable therewith, and provided with two co-axial separate pressure chambers, a movable pressure operated part in each chamber, a valve operating device connecting said movable parts with said reversing valve mechanism for operating the same, pipe connections from each of said chambers on opposite sides of the pressure operated part therein to corresponding portions of the main and auxiliary actuator cylinders, to effect the operation of said movable parts and the valve mechanism of the auxiliary actuator by the operator controlled valve mechanism of the main actuator, each of said chambers being provided with a bypass for connecting the portions thereof on opposite sides of the pressure operated part therein, and a check valve for each of said by-passes.

14. The combination with a main power actuator comprising a cylinder closed at both ends, a double acting piston in said cylinder, reversing valve mechanism for said actuator, means for connecting said cylinder with a source of suction and with the atmosphere under the control of said valve mechanism, an operator operated part connected with said valve mechanism, and means for connecting said piston with a part to be operated, an auxiliary actuator comprising a cylinder closed at both ends, a double acting piston in said cylinder, controlling valve mechanism for the auxiliary actuator located in the piston thereof, means for connecting said valve mechanism with said source of suction and with the atmosphere, hollow piston rods connected with said auxiliary actuator piston and extending through the ends of the cylinder thereof, said valve mechanism being constructed to connect the portion of the auxiliary actuator cylinder on one side of the piston with the source of suction, and the portion on the opposite side of the piston with the atmosphere, and to reverse said connections, a fluid pressure operated control device carried by one of said hollow piston rods and movable therewith, and provided with two co-axial separate pressure chambers, a movable pressure operated part in each chamber, a valve operating device connecting said movable parts with said reversing valve mechanism for operating the same, pipe connections from each of said chambers on opposite sides of the movable pressure operated part therein to corresponding portions of the main and auxiliary actuator cylinders, the valve mechanism of the main actuator being constructed to connect the portions of the main actuator cylinder on opposite sides of the piston therein with the source of suction when the said piston is in retracted position, to maintain the said piston normally submerged in vacuum, said control device having each chamber thereof provided with a by-pass for connecting the portions of each chamber on opposite sides of the movable pressure operated part therein, with the source of suction when the main actuator piston is in the retracted position, to place each end portion of the auxiliary actuator cylinder in communication with the corresponding portion of the main actuator cylinder and with the source of suction, and maintain the auxiliary actuator piston also submerged in vacuum, and a check valve for each of said by-passes.

15. In brake mechanism for automotive vehicles provided with independently operable brake mechanisms, the combination with a main power actuator comprising a cylinder, a double acting piston therein, a main reversing valve mechanism therefor, means for establishing differential pressures on opposite faces of the piston under the control of said reversing valve mechanism, an operator operated part connected with said reversing valve mechanism, means for connecting said piston with certain of said brake mechanisms, an auxiliary actuator comprising a cylinder, a double acting piston therein, independent reversing valve mechanism therefor, means for establishing differential pressures on opposite faces of said auxiliary actuator piston under the control of its valve mechanism, and means for connecting the auxiliary actuator piston with certain of said brake mechanisms, of a fluid pressure operated control device having movable pressure operated portions operatively connected with the said independent valve mechanism of the auxiliary actuator, and pipe connections between said control device and the main actuator cylinder, and between said control device and the auxiliary actuator cylinder, for effecting the operation of said movable portions of the control device and the reversing valve mechanism of the auxiliary actuator by variations of pressure within the main and auxiliary actuator cylinders, and a connection between said operator operated part and the brake mechanism connected with the main actuator piston, for enabling the operator to add his physical force to that of the main actuator and to actuate said brake mechanism by his physical force alone in case of failure of power.

16. In a brake system for automotive vehicles propelled by an internal combustion engine having a suction passage, and provided with independently operable brake mechanism, the combination with a main power actuator comprising a cylinder, a double acting piston therein, controlling and reversing valve mechanism, and means for connecting the cylinder with the suction passage of the engine and with the atmosphere under the control of said valve mechanism, an operator operated part connected with said valve mechanism, and connections between said piston and certain of said brake mechanism, an auxiliary power actuator comprising a cylinder, a double acting piston therein, independent controlling and reversing valve mechanism, and means for connecting said auxiliary actuator cylinder with said suction passage and directly with the atmosphere independently of the main actuator, under the control of said independent valve mechanism, and connections between said auxiliary actuator piston and other of said brake mechanism, of a fluid pressure operated control device located adjacent to said auxiliary actuator, and having movable pressure operated portions operatively connected with said independent valve mechanism of the auxiliary actuator, and pipe connections between said control device and the cylinders of the actuators, whereby the pistons of both actuators and the brake mechanisms connected therewith may be substantially simultaneously actuated in both directions under the control of the operator operated valve mechanism of the main actuator.

17. In a brake system for automotive vehicles provelled by an internal combustion engine having a suction passage, and provided with independently operable brake mechanism, the combination with a main power actuator comprising a cylinder, a double acting piston therein, controlling and reversing valve mechanism, and means for connecting the cylinder with the suction passage of the engine and with the atmosphere under the control of said valve mechanism, an operator operated part connected with said valve mechanism, and connections between said piston and certain of said brake mechanism, an auxiliary power actuator comprising a cylinder, a double acting piston therein, independent controlling and reversing valve mechanism, and means for connecting said auxiliary actuator cylinder with said suction passage and directly with the atmosphere independently of the main actuator, under the control of said independent valve mechanism, and connections between said auxiliary actuator piston and other of said brake mechanism, of a fluid pressure operated control device located adjacent to said auxiliary actuator, and having movable pressure operated portions operatively connected with said independent valve mechanism of the auxiliary actuator, and pipe connections between said control device and the cylinders of the actuators, whereby the pistons of both actuators and the brake mechanisms connected therewith may be substantially simultaneously actuated in both directions under the control of the operator operated valve mechanism of the main actuator, and connections between the operator operated part and the brake mechanism connected with the main actuator piston, containing a provision for lost motion sufficient to insure the operation of the valve mechanism connected with the operator operated part, whereby the physical force of the operator may be added to that of the main actuator, and the brake mechanism connected with the main actuator piston may be operated by the physical force of the operator alone in case of failure of power.

18. In brake mechanism for a main automotive vehicle provided with an internal combustion engine having a suction passage, and brake mechanism for the vehicle, and a trailer propelled by the main vehicle and provided with independently operable brake mechanism, the combination with a main power actuator located on the main vehicle and comprising a cylinder, a double acting piston therein, controlling and reversing valve mechanism, and means for connecting the cylinder with said suction passage and with the atmosphere under the control of said valve mechanism, connections between the main actuator piston and brake mechanism for the main vehicle, an operator operated part on the main vehicle connected with said valve mechanism, an auxiliary actuator carried by the trailer comprising a cylinder, a double acting piston, independent controlling and reversing valve mechanism, and means for connecting the auxiliary actuator cylinder with the said suction passage of the engine and directly with the atmosphere under the control of said independent valve mechanism, and means for connecting the auxiliary actuator piston with brake mechanism for the trailer, of a fluid pressure operated control device on said trailer having movable pressure operated portions connected with said independent valve mechanism, and pipe connections from said control device to the main and auxiliary actuator cylinders for operating the valve mechanism of the auxiliary actuator by variations of pressures within the said actuator cylinders, whereby the brake mechanism of the main vehicle and trailer may be substantially simultaneously applied and released under the control of the operator operated valve mechanism of the main actuator.

19. In a brake system for a main automotive vehicle provided with an internal combustion engine having a suction passage, and brake mechanism for the vehicle, and a trailer propelled by the main vehicle and provided with independently operable brake mechanism, the combination with a main power actuator located on the main vehicle and comprising a cylinder, a double acting piston therein, controlling and reversing valve mechanism, and means for connecting the cylinder with said suction passage and with the atmosphere under the control of said valve mechanism, connections between the main actuator piston and brake mechanism for the main vehicle, an operator operated part on the main vehicle connected with said valve mechanism, an auxiliary actuator carried by the trailer comprising a cylinder, a double acting piston, independent controlling and reversing valve mechanism, and means for connecting the auxiliary actuator cylinder with the said suction passage of the engine and directly with the atmosphere under the control of said independent valve mechanism, and means for connecting the auxiliary actuator piston with brake mechanism for the trailer, of a fluid pressure operated control device on said trailer having movable pressure operated portions connected with said independent valve mechanism, and pipe connections from said control device to the main and auxiliary actuator cylinders for operating the valve mechanism of the auxiliary actuator by variations of pressures within the said actuator cylinders, whereby the brake mechanism of the main vehicle and trailer may be substantially simultaneously applied and released under the control of the operator operated valve mechanism of the main actuator, and connections between the operator operated part and brake mechanism for the main vehicle connected with the main actuator piston, having a provision for lost motion sufficient to operate the main actuator valve mechanism, whereby the operator may add his physical force to the brake mechanism of the main vehicle in addition to that of the actuator and may apply the brake mechanism of the main vehicle by physical force alone in case of failure of power.

20. In a brake system for a main automotive vehicle provided with an internal combustion engine having a suction passage, and brake mechanism for the vehicle, and a trailer propelled by the main vehicle and provided with independently operable brake mechanism, the combination with a main power actuator located on the main vehicle and comprising a cylinder, a double acting piston therein, controlling and reversing valve mechanism, and means for connecting the cylinder with said suction passage and with the atmosphere under the control of said valve mechanism, connections between the main actuator piston and brake mechanism for the main vehicle, an operator operated part on the main vehicle connected with said valve mechanism, an auxiliary actuator carried by the trailer comprising a cylinder, a double acting piston, independent controlling and reversing valve mechanism, and means for connecting the auxiliary actuator cylinder with the said suction passage of the engine and directly with the atmosphere under the control of said independent valve mechanism, and means for connecting the auxiliary actuator piston with brake mechanism for the trailer, of a fluid pressure operated control device on said trailer provided with two chambers, co-axial pressure operated movable parts, each interposed between portions of one of said chambers, connections from said movable parts to the valve mechanism of the auxiliary actuator, pipe connections from each chamber on opposite sides of the movable part therein to corresponding portions of the main and auxiliary actuator cylinders, whereby the brake mechanism for the main vehicle and trailer may be substantially simultaneously applied and released under the control of the operator operated valve mechanism of the main actuator.

21. In a brake system for a main automotive vehicle provided with an internal combustion engine having a suction passage, and brake mechanism for the vehicle, and a trailer propelled by the main vehicle and provided with independently operable brake mechanism, the combination with a main power actuator located on the main vehicle and comprising a cylinder, a double acting piston therein, controlling and reversing valve mechanism, and means for connecting the cylinder with said suction passage and with the atmosphere under the control of said valve mechanism, connections between the main actuator piston and brake mechanism for the main vehicle, an operator operated part on the main vehicle connected with said valve mechanism, an auxiliary actuator carried by the trailer comprising a cylinder, a double acting piston, independent controlling and reversing valve mechanism, and means for connecting the auxiliary actuator cylinder with the said suction passage of the engine and directly with the atmosphere under the control of said independent valve mechanism, and means for connecting the auxiliary actuator piston with brake mechanism for the trailer, of a fluid pressure operated control device on said trailer provided with two chambers, co-axial pressure operated movable parts, each interposed between portions of one of said chambers, connections from said movable parts to the valve mechanism of the auxiliary actuator, pipe connections from each chamber on opposite sides of the movable part therein to corresponding portions of the main and auxiliary actuator cylinders, each of said chambers being provided with a by-pass connecting the portions thereof on opposite sides of the pressure operated part therein, and a check valve for each of said by-passes.

22. In a brake system for a main automotive vehicle provided with an internal combustion engine having a suction passage, and brake mechanism for the vehicle, and a trailer propelled by the main vehicle and provided with independently operable brake mechanism, the combination with a main power actuator located on the main vehicle and comprising a cylinder, a double acting piston therein, controlling and reversing valve mechanism, and means for connecting the cylinder with said suction passage and with the atmosphere under the control of said valve mechanism, connections between the main actuator piston and brake mechanism for the main vehicle, an operator operated part on the main vehicle connected with said valve mechanism, an auxiliary actuator carried by the trailer comprising a cylinder, a double acting piston, indepedent controlling and reversing valve mechanism, and means for connecting the auxiliary actuator cylinder with the said suction passage of the engine and directly with the atmosphere under the control of said independent valve mechanism, and means for connecting the auxiliary actuator piston with brake mechanism for the trailer, of a fluid pressure operated control device on said trailer provided with two chambers, coaxial pressure operated movable parts, each interposed between portions of one of said chambers, connections from said movable parts to the valve mechanism of the auxiliary actuator, pipe connections from each chamber on opposite sides of the movable part therein to corresponding portions of the main and auxiliary actuator cylinders, the main actuator being provided with means for maintaining its cylinder on both sides of the piston therein in communication with the suction passage of the engine when the piston is in retracted position, and the chambers of said control device being each provided with a by-pass connecting the portions thereof on opposite sides of the movable part therein, and check valves for said by-passes adapted to open in a direction toward the portion of the chamber connected with the main actuator, whereby the auxiliary actuator cylinder on both sides of the piston will be connected with the suction passage of the engine when the main actuator piston is in retracted position.

23. In a brake system for a main automotive vehicle provided with an internal combustion engine having a suction passage, and brake mechanism for the vehicle, and a trailer propelled by the main vehicle and provided with independently operable brake mechanism, the combination with a main power actuator located on the main vehicle and comprising a cylinder, a double acting piston therein, controlling and reversing valve mechanism, and means for connecting the cylinder with said suction passage and with the atmosphere under the control of said valve mechanism, connections between the main actuator piston and brake mechanism for the main vehicle, an operator operated part on the main vehicle connected with said valve mechanism, an auxiliary actuator carried by the trailer comprising a cylinder, a double acting piston, independent controlling and reversing valve mechanism, and means for connecting the auxiliary actuator cylinder with the said suction passage of the engine and directly with the atmosphere under the control of said independent valve mechanism, and means for connecting the auxiliary actuator piston with brake mechanism for the trailer, of a fluid pressure operated control device on said trailer provided with two chambers, co-axial pressure operated movable parts, each interposed between portions of one of said chambers, connections from said movable parts to the valve mechanism of the auxiliary actuator, pipe connections from each chamber on opposite sides of the movable part therein to corresponding portions of the main and auxiliary actuator cylinders, the main actuator being provided with means for maintaining its cylinder on both sides of the piston therein in communication with the suction passage of the engine when the piston is in retracted position, and the chambers of said control device being each provided with a by-pass connecting the portions thereof on opposite sides of the movable part therein, and check valves for said by-passes adapted to open in a direction toward the portion of the chamber connected with the main actuator, whereby the auxiliary actuator cylinder on both sides of the piston will be connected with the suction passage of the engine when the main actuator piston is in retracted position, and check valves on the trailer in the pipe connections between the auxiliary actuator valve mechanism and the suction passage of the engine, and between the control device and the main actuator cylinder forward of the piston therein, and frangible portions in said pipes between said check valves and the main vehicle, whereby in case the trailer breaks away from the main vehicle said check valves will maintain rarification in the auxiliary actuator cylinder forward of the piston, auxiliary actuator cylinder forward of the piston and in the control device, and whereby the admission of atmospheric air, through the broken pipe connection between the main actuator cylinder in rear of the piston therein and the control device, would automatically operate the valve mechanism of the auxiliary actuator to apply the trailer brakes.

24. In a brake system for automotive vehicles provided with an internal combustion engine having a suction passage, and independently operable brake mechanisms, the combination with a main and an auxiliary power actuator, each comprising a cylinder, a double acting piston therein, and controlling and reversing valve mechanism therefor, means for connecting each of said pistons with certain of said brake mechanisms, means for connecting each of said cylinders under the control of the valve mechanism therefor with said suction passage and with the atmosphere, of a pressure operated control device adjacent to the auxiliary actuator provided with movable portions operatively connected with the valve mechanism for the auxiliary actuator, and connections between said control device and the main and auxiliary actuator cylinders, said control device being constructed to normally maintain the auxiliary actuator cylinder on both sides of the piston therein, in communication with said suction passage and said piston submerged in vacuum, and to effect a power stroke of the auxiliary actuator piston to apply the brakes connected therewith under the control of the valve mechanism for the main actuator without delivering appreciable quantities of air from the auxiliary actuator cylinder to said suction passage, and an operator operated device connected with the valve mechanism for the main actuator.

25. In a brake system for automotive vehicles having an internal combustion engine provided with a suction passage, and independently operable brake mechanisms, the combination with a main and an auxiliary power actuator, each comprising a cylinder, a double acting piston therein, and controlling and reversing valve mechanism, an operator operated part connected with the valve mechanism of the main actuator, and connections from each piston to certain of said brake mechanisms, the valve mechanism of the main actuator being constructed to connect the main actuator cylinder on both sides of the piston therein with said suction passage when said piston is in retracted position, of a pressure operated control device adjacent to the auxiliary actuator provided with movable portions operatively connected with the valve mechanism of the auxiliary actuator, and connections between said control device and the main and auxiliary actuator cylinders, said control device being constructed to normally maintain the auxiliary actuator cylinder on both sides of the piston therein in communication with said suction passage and the auxiliary actuator piston submerged in vacuum, and to effect a power stroke of the auxiliary actuator piston under the control of the main actuator valve mechanism without delivering appreciable quantities of air from the auxiliary actuator cylinder to said suction passage.

26. In combination, main and auxiliary actuators, each including a cylinder and a double acting piston, means connecting the pistons of said actuators with parts to be operated, valve mechanism for each of said actuators adapted to control higher and lower pressures to either side of the pistons in said cylinder, a control device operatively connected with the valve mechanism of the auxiliary actuator, and fluid connections between said actuators for effecting the operation of the valve mechanism of the auxiliary actuator through the operation of the control device by variations of pressure within the main and auxiliary cylinders.

27. In combination, main and auxiliary actuators, each including a cylinder and a double acting piston operating therein, means connecting the pistons and the actuators with parts to be operated, control valve mechanism for each of said actuators adapted to control higher and lower pressures to either side of the pistons in said cylinders, a control device operatively connected with the valve mechanism of one of the actuators, and fluid connections between said actuators for effecting the operation of the valve mechanism of the actuator with which the control device is associated through the operation of said control device by variation of pressure within the main and auxiliary cylinders.

28. In combination, main and auxiliary actuators, each including a cylinder and a double acting piston operating therein, means connecting the pistons of said actuators with parts to be operated, valve mechanism for each of said actuators located within the pistons of said actuators and adapted to control higher and lower pressures to either side of the pistons in said cylinders, and a control device operatively connected with the valve mechanism of one of the actuators and connected to the other actuator for effecting the operation of the valve mechanism of the actuator with which it is associated through variation of pressures in the main and auxiliary cylinders.

CALEB S. BRAGG.
VICTOR W. KLIESRATH.